(12) United States Patent
Henderson et al.

(10) Patent No.: US 7,624,160 B2
(45) Date of Patent: Nov. 24, 2009

(54) METHODS, SYSTEMS, AND COMPUTER PROGRAM PRODUCTS FOR CLIENT SIDE PREFETCHING AND CACHING OF PORTLETS

(75) Inventors: Roderick Charles Henderson, Apex, NC (US); Yongcheng Li, Cary, NC (US); Thomas Francis McElroy, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 10/838,837

(22) Filed: May 4, 2004

(65) Prior Publication Data

US 2005/0256940 A1 Nov. 17, 2005

(51) Int. Cl.
G06F 15/16 (2006.01)
(52) U.S. Cl. .................. 709/219; 709/217; 709/218
(58) Field of Classification Search .................. 709/219
See application file for complete search history.

(56) References Cited

U.S. PATENT DOCUMENTS

| | | | | |
|---|---|---|---|---|
| 6,067,565 | A * | 5/2000 | Horvitz | 709/218 |
| 6,199,107 | B1 * | 3/2001 | Dujari | 709/219 |
| 6,327,628 | B1 * | 12/2001 | Anuff et al. | 719/311 |
| 6,366,947 | B1 * | 4/2002 | Kavner | 709/203 |
| 6,397,217 | B1 | 5/2002 | Melbin | |
| 6,442,651 | B2 * | 8/2002 | Crow et al. | 711/118 |
| 6,622,168 | B1 | 9/2003 | Datta | |
| 7,003,566 | B2 * | 2/2006 | Codella et al. | 709/224 |
| 7,231,496 | B2 * | 6/2007 | Curtis | 711/137 |
| 2001/0034771 | A1 * | 10/2001 | Hutsch et al. | 709/217 |
| 2001/0051927 | A1 | 12/2001 | London et al. | |
| 2002/0010761 | A1 * | 1/2002 | Carneal et al. | 709/219 |
| 2002/0065932 | A1 | 5/2002 | Kobayashi et al. | |
| 2002/0065933 | A1 | 5/2002 | Kobayashi et al. | |
| 2002/0078165 | A1 * | 6/2002 | Genty et al. | 709/217 |
| 2002/0091763 | A1 * | 7/2002 | Shah et al. | 709/203 |

(Continued)

OTHER PUBLICATIONS

China IP Law, Information Disclosure Statement, Mar. 21, 2008, 1 page, China.

(Continued)

*Primary Examiner*—William C Vaughn, Jr.
*Assistant Examiner*—Joiya M Cloud
(74) *Attorney, Agent, or Firm*—Hoffman Warnick LLC

(57) ABSTRACT

Methods, systems, and computer program products are provided for prefetching and caching portal information in a client application in a logically separated client/server computing environment. Before a user requests a specific portlet view to be displayed at the user's web browser, portlet information from a server is prefetched. The portlet information may include content data to be displayed in a portlet view, meta data describing how the content data will be displayed, and combinations of both content data and meta data. The prefetching step is performed on the client of the logically separated client/server computing environment. The client stores the prefetched portlet. Once the prefetched portlet information has been stored, upon a user request such as clicking on a link in a portlet view, the method retrieves the stored portlet information and displays the portlet information in a corresponding portlet view. From the user's perspective, the portlet view may display new content information, previously viewed content information in a different format, or a combination of new content information and old content information presented in a different format.

14 Claims, 5 Drawing Sheets

U.S. PATENT DOCUMENTS

| | | |
|---|---|---|
| 2003/0005053 A1* | 1/2003 | Novaes .................... 709/204 |
| 2003/0009538 A1* | 1/2003 | Shah et al. ................ 709/219 |
| 2003/0105857 A1 | 6/2003 | Kamen et al. |
| 2003/0212760 A1 | 11/2003 | Chen et al. |
| 2004/0098467 A1* | 5/2004 | Dewey et al. ............. 709/219 |
| 2004/0205555 A1* | 10/2004 | Hind et al. ................ 715/513 |
| 2004/0243928 A1* | 12/2004 | Hesmer et al. ............ 715/505 |
| 2005/0018152 A1* | 1/2005 | Ting et al. ................ 353/121 |
| 2005/0050021 A1* | 3/2005 | Timmons ..................... 707/3 |
| 2005/0060498 A1* | 3/2005 | Curtis ....................... 711/134 |
| 2005/0223310 A1* | 10/2005 | Wachholz-Prill et al. . 715/501.1 |

OTHER PUBLICATIONS

Hesmer S: "Portlet Development Guide, Working with the Portlet API 1.1", Apr. 2, 2002, XP002267927, p. 6-p. 13, p. 47-48.

Li Fan et al: "Web Prefetching Between Low-bandwidth Clients and Proxies: Potential and Performance", Performance Evaluation Review, Association for Comuting Machinery, New York, New York, US, vol. 27, No. 1, May 1, 1999, p. 178-187, XP002157516, ISSN: 0163-5999, the whole doc.

* cited by examiner

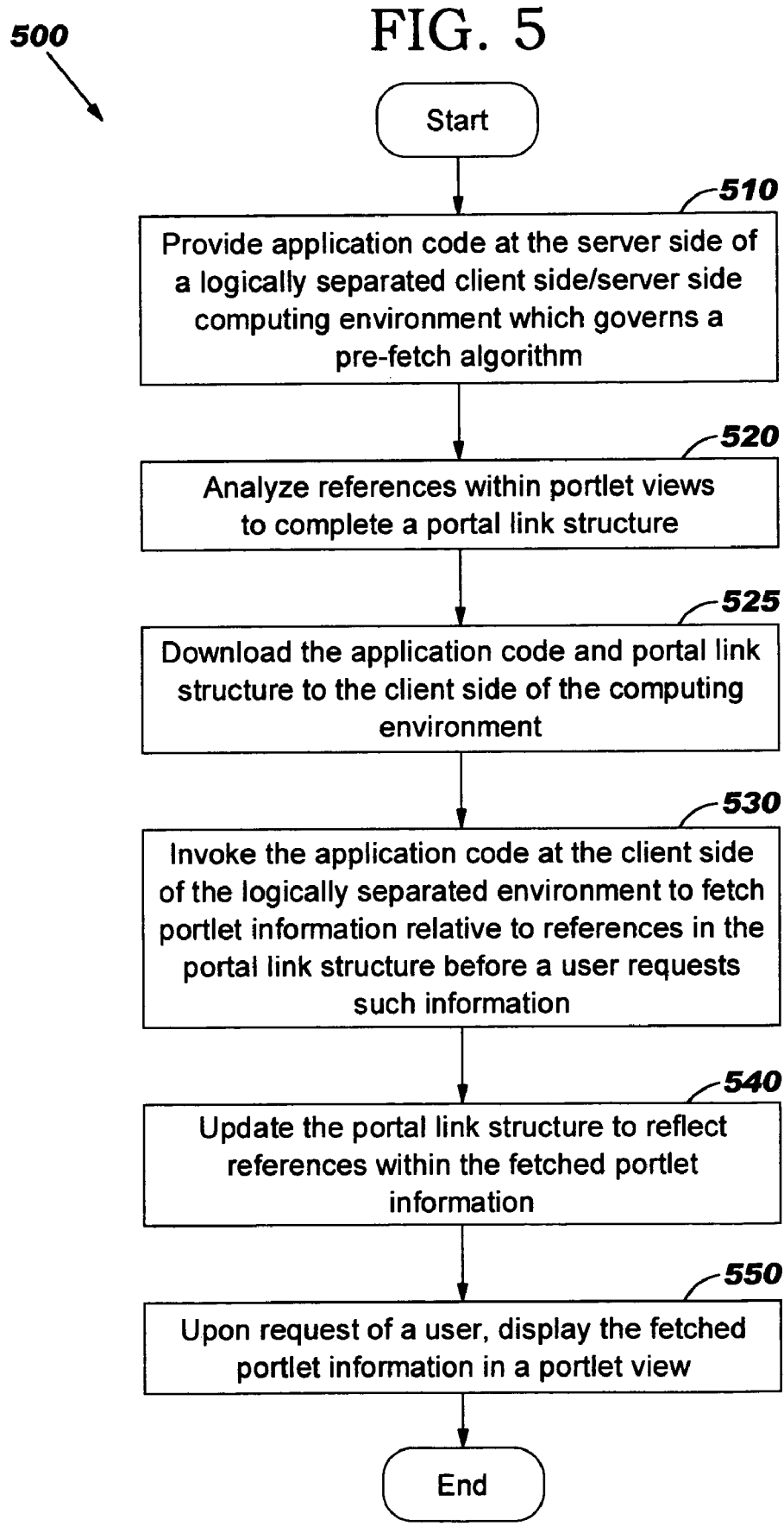

METHODS, SYSTEMS, AND COMPUTER PROGRAM PRODUCTS FOR CLIENT SIDE PREFETCHING AND CACHING OF PORTLETS

FIELD OF THE INVENTION

The present invention generally relates to improved methods, systems, and computer program products for processing information, and more particularly, to advantageous methods, systems, and computer program products for prefetching and caching of portlets in a networked computer environment.

BACKGROUND OF THE INVENTION

With the increase in the popularity of the "World Wide Web" (WWW), the use of web browsers or browsers has become more common. For example, a web browser available from Netscape, Inc., known as Netscape Navigator®, can provide a convenient way to operate applications and view data via the web. Some of the applications available via the web can provide a high level of interaction with the user as these applications may be written in native languages such as C or Java®. In particular, applications written in these types of native languages can be specifically written to require intensive user interaction. As the level of interaction between the user and the application increases, so can the communication between the web browser and the application. This increase in communication can decrease the available network bandwidth resulting in response time delay of the application as perceived by the user. For example, each time the user requests data which is managed by the application, the user typically has to wait for a request to be sent over the web to the application, for the application to retrieve the requested data, and for the application to reply with the requested data.

In addition to the problems outlined above regarding generic applications, a new type of environment, commonly referred to as the "emerging web desktop," may cause even greater problems similar to those discussed above. In particular, the emerging web desktop can provide users with access to what is commonly referred to as a portal. The portal can allow a user to access multiple applications through a single screen displayed by the web browser. For example, some portals allow users to access applications that can show disparate data, such as weather, sports, stock information, or the like, to a user on a single screen. Each of the disparate types of data is typically controlled by a portlet. A portlet is computer code which adheres to interfaces and behaviors specified in a portlet specification and executes in a portal application server. Examples of a portlet specification include IBM's portlet API and Java™ Standardization Request for the Java Portlet Specification defined by the Java Community Process.

Much of the processing needed to manage the portal such as administration, customization, and switching can place even greater demands on the bandwidth available between the browser and the application. Such increased demands on the bandwidth available may also translate in a decrease in the application's response time from the perspective of the user.

Among their other failings, conventional approaches including web browsers offer limited optimization opportunities because of the granularity of information currently cached. For example, one conventional approach can only cache uniform resource locator (URLs) which refer to an entire hypertext markup language (HTML) page or cache the entire HTML page itself on a client, where the entire HTML page typically consumes the entire presentation area of the browser. Other conventional approaches include server side caching which do not address response time delays between a client and a server.

It is known to use a technology commonly referred to as XForms to address some of the performance issues that arise when using a web browser to access data over the web. In particular, XForms technology can treat the data to be presented in a web browser separately from how the data will be presented. XForms technology, however, does not address some of the issues discussed above that can arise when using a web browser to access applications or data via the web.

SUMMARY OF THE INVENTION

Among its several aspects, due to the increasing demand placed on bandwidth and response time requirements, the present invention recognizes that a need exists for increasing the performance of existing web applications. The present invention also recognizes that methods, systems, and computer program products are needed to predict portlet information which will be consumed by a user and to retrieve that portlet information before the user requests it. Further, the present invention recognizes the value of offloading traditional portal server functions by providing systems, methods, and computer program products which execute on a client, retrieve portlet information and cache portlet information in the client computer before the user requests it.

According to one aspect of the present invention, a method is provided for prefetching and caching portal information in a client application in a logically separated client/server computing environment. Before a user requests a specific portlet view to be displayed at the user's web browser, the method prefetches portlet information from a server. The portlet information includes content data to be displayed in a portlet view, meta data describing how the content data will be displayed, or combinations of both content data and meta data. The prefetching step is performed on a client side of the logically separated client/server computing environment. The client side stores the prefetched portlet. Once the prefetched portlet information has been stored, upon a user request such as clicking on a link in a portlet view, the method retrieves the stored portlet information and displays the portlet information in a corresponding portlet view rather than retrieving the fetched information at the time the user requests it. Such prefetching takes place when the user is not actively requesting new information to be retrieved from the server thus increasing the application's response time from the perspective of the user. Additionally, from the user's perspective, the portlet view may display new content information, previously viewed content information in a different format, or a combination of new content information and old content information presented in a different format.

A more complete understanding of the present invention, as well as further features and advantages of the invention, will be apparent from the following detailed description and the accompanying drawings.

BRIEF DESCRIPTION OF THE DRAWINGS

FIG. 5 is a flowchart illustrating a process according to the present invention.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art As will be appreciated by one of skill in the art, the present invention may be embodied as methods, systems, or computer program products. Accordingly, the present invention may take the form of a hardware embodiment, a software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, Smalltalk, JavaScript®, Visual Basic®, TSQL, Perl, or in various other programming languages. Software embodiments of the present invention do not depend on implementation with a particular programming language. Portions of the code may execute entirely on one or more systems utilized by an intermediary server.

Figure 1:
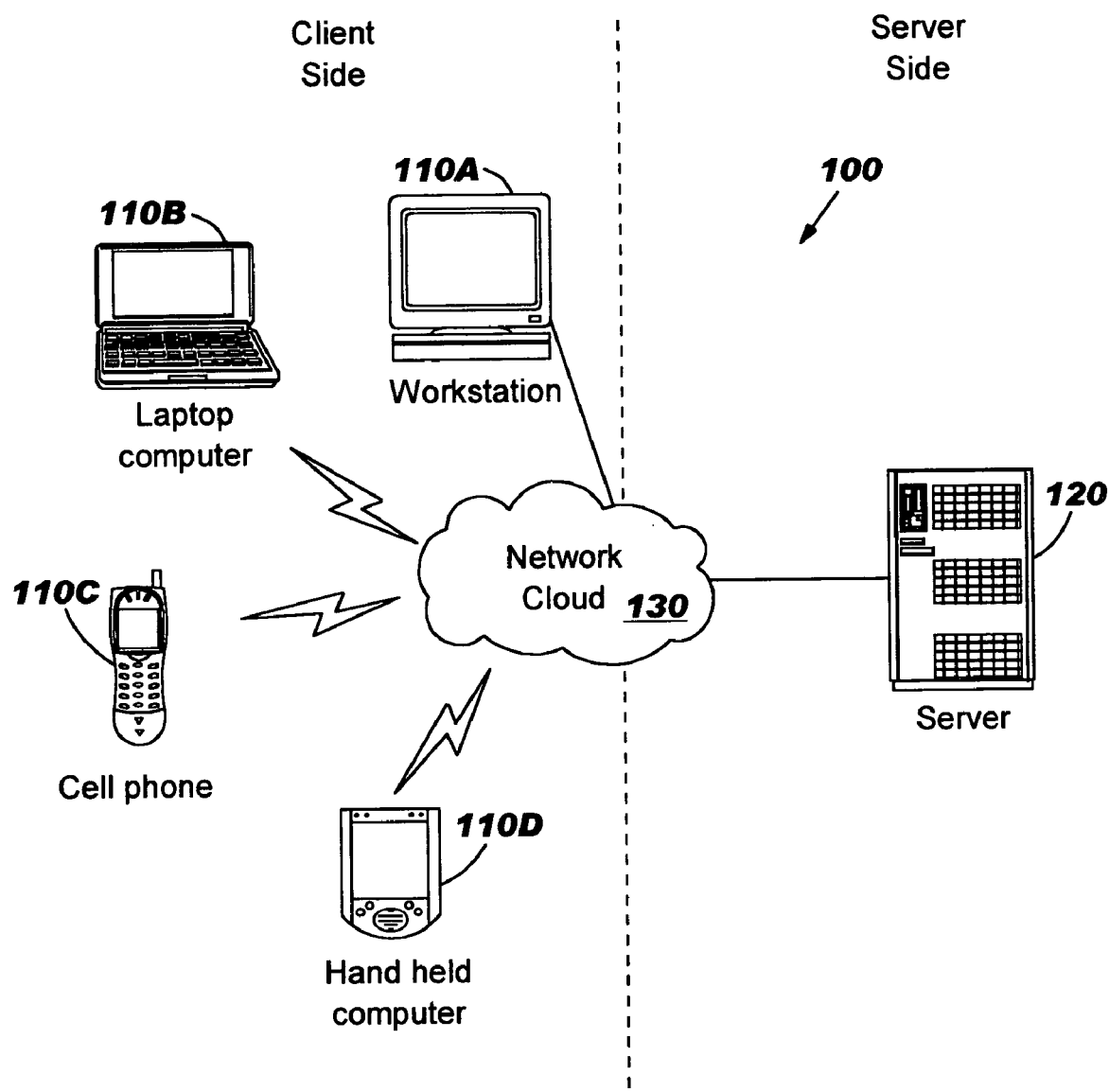
FIG. 1 is an illustration of an exemplary system in which the present invention may be suitably implemented.

The code may execute entirely on one or more servers, or it may execute partly on a server and partly on a client within a client device or as a proxy server at an intermediate point in a communications network. Regarding the former scenario, FIG. 1 is an illustration of an exemplary system 100 in which the present invention may be suitably employed. The system 100 includes a client device such as a workstation 110A, a laptop computer 110B, a cell phone 110C, a handheld computer 110D, or any other computer based device which can execute computer program code. The client device may be connected to a server 120 over network 130 such as a LAN, WAN or other intranet, or the connection may be made through the Internet via an Internet service provider (ISP). It is understood that the present invention is not TCP/IP-specific or Internet-specific. The present invention may be embodied using various transport and data link protocols over various types of computer networks.

Embodiments according to the present invention can operate in a logically separated client side/server side computing environment, sometimes referred to hereinafter as a client/server environment. The client/server environment is a computational architecture that involves a client process or client, a server process or server, and the client requesting service from a server. In general, the client/server environment maintains a distinction between processes, although client and server processes may operate on different machines or on the same machine. Accordingly, the client and server sides of the client/server environment are referred to as being logically separated as shown in FIG. 1. Usually, when client and server processes operate on separate devices, each device can be customized for the needs of the respective process. For example, a server process can execute on a system having large amounts of memory and disk space, whereas the client process often executes on a system having a graphic user interface provided by high end video cards and large screen displays.

A client may include a program, such as a web browser, that requests information, such as web pages or portlet views, from a server. Examples of clients include browsers such as Netscape Navigator® and Internet Explorer®. Browsers typically provide a graphical user interface for retrieving and viewing web pages, web portals, portlets, applications, and other resources served by web servers.

A server may include a program that responds to requests from the client. Some examples of servers are International Business Machines Corporation's (IBM) family of Lotus Domino® servers, IBM's Websphere® servers, the Apache server, and other suitable servers.

The clients and servers can communicate using a standard communications mode, such as hypertext transport protocol (HTTP). According to the HTTP request/response communications model, HTTP requests are sent from the client to the server and HTTP responses are sent from the server to the client in response to an HTTP request. In operation, the server waits for a client to open a connection and to request information, such as a web page, portlet, or other like information. In response, the server sends a copy of the requested information to the client, closes the connection to the client, and waits for the next connection. It will be understood that the server can respond to requests from more than one client.

The present invention is described below with reference to block diagrams and flowchart illustrations of methods, systems and computer program products according to embodiments of the present invention. It is understood that each block of the block diagrams and flowchart illustrations, and combinations of blocks in the block diagrams and a flowchart illustration, can be implemented by computer program code. The computer program code may be provided to a processor of a general purpose computer, special purpose computer, or other programmable data processing apparatus to produce a machine, such that code, which execute via the processor of the computer or other programmable data processing apparatus, create means for implementing the functions specified in the block diagrams and/or flowchart block or blocks.

Computer program code or instructions may be stored in a computer readable memory that can direct a computer or other programmable data processing apparatus to function in a particular manner, such that the instructions stored in the computer readable memory produce an article of manufacture including instruction means which implement the function specified in the block diagrams or flowcharts.

The computer program code may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

As used herein, the term "web site" can include a related collection of files that includes a beginning file called a home page. From the home page, a visitor can access other files and applications at the web site. A large web site may utilize a number of servers, which may or may not be different and may or may not be geographically dispersed. For example, the web site of the International Business Machines Corporation (http://www.ibm.com) consists of thousands of web pages and files dispersed over multiple web servers in locations worldwide.

Although the present invention is described herein with reference to web pages, web servers, and the like, it will be understood that the present invention can be practiced with any computer displayable documents having information.

As is known to those skilled in the art, a web page is conventionally formatted via a standard page description language such as HTML, which typically contains text and can reference graphics, sound, animation, and video data. HTML provides for basic document formatting and allows a web content provider to specify anchors or hypertext links, typically manifested as highlighted text, to other servers. When a user selects or activates a particular hypertext link, a browser running on the user's client device reads and interprets an address, called a uniform resource locator (URL) associated with the hypertext link, connects the browser with a web server at that address, and makes a request such as an HTTP request for the file identified in the hypertext link. The web server then sends the requested file to the client which interprets and renders the web page for display. The term "user" as used herein can be a software process or a human being.

A web browser can be used to view what is sometimes referred to as a web portal or portal. As understood by those skilled in the art, web portals can operate according to the same communication protocols described above in reference to clients and servers where the client includes a web browser that views portal pages or portal views and the server is sometimes referred to as a portal applications server that serves requested information to the web browser.

A portal may cause display of a single presentation or view of information from multiple sources, sometimes referred to as an aggregation of information. Portals often include information such as calendars and todo lists, discussion groups, announcements and reports, news, stock quotes, searches, email and address books, weather, maps, shopping, and the like, all of which may be provided to the portal by different sources or applications.

Much of the information provided by the portal can be customized by the user. For example, some portals, such as, My Lycos®, can be customized to display the weather forecast in a user's area or display sports scores for the user's favorite teams. Moreover, the customization can include the look and feel of portal itself. For example, some portals can be customized to be displayed using particular screen themes.

A portal may also use profiling to present and customize content that interests the user or to provide accurate demographic data for prospective advertisers and to help them match ad content with likely sales prospects. Accordingly, portals, and recently other web providers such as news services, frequently request that the user complete a profile form. The profile form may request, for example, the user's name, gender, age, address, income bracket, employment, recreational activities, hobbies, and the like. The data provided in the user profile may be used along with data mining such as a technique for selecting contact information for a small segment of the population from a large database of contact information, for example, to learn more about the user and target the user for print, email, direct mail advertising, or the like. The user can customize the portal page, to show information or transactions which is of interest to the user. From a user's perspective, a portlet is a content channel or application to which the user can subscribe.

Portlets are Java® based web components executed on a server which process requests and generate dynamic content. Portals use portlets as pluggable user interface components that provide a presentation layer to information systems. Portlet views correspond to visible active components a user of the portal sees within the portal page. Similar to a window in a desktop computer, each portlet view is allocated a portion of the client screen within the portal view where the relevant information is displayed. The portlet generates content to be embedded into portal pages viewed by the user. A portlet itself may have many portlet views where each view represents a particular state of the portlet. A portlet may interact with data typically managed at a server to lead to a transaction with a user. Each portlet view may correspond to a different state of the transaction. For example, through a portlet, a user may sell stock. One portlet view may represent the user's brokerage account status displaying the different stocks in which the user has a position. The portlet which controls the transaction may transition the first portlet view to a second portlet view when the user clicks on one of his stocks in his portfolio. The second portlet view would represent the view that the user enters the number of shares to sell and the minimum sales price acceptable by the user. A portlet view may be developed by any technology which separates content generation from a user interface such as Sun Microsystem's Java® Server Pages technology.

Figure 2:
FIG. 2 is an illustration of an exemplary portal view that can be provided utilizing embodiments according to the present invention.
Figure 2:
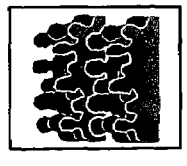

FIG. 2 is a schematic illustration of an exemplary portal view 200 displayed by a web browser that can operate according to the present invention. As shown in FIG. 2, the portal view 200 includes multiple views of different information referred to as portlet views. In particular, the portal view 200 includes three portlet views 205, 210, and 215, which are related to the display of information related to stocks, weather, and news, respectively. According to FIG. 2, portlet view 205 shows stock information that is of interest to the user. Portlet view 205 can be customized to display information, such as prices, of stocks, bonds, stock exchanges, and the like. Portlet view 210 displays weather information related to a particular geographic location of interest to the user and can also be customized. Portlet view 215 shows news information of interest to the user, which can also be customized. In operation, a user can create a need for updated information for any of the portlets generating information shown in portal view 200. For example, a user can request an updated stock quote via a portlet corresponding to portlet view 205, request updated weather through a portlet corresponding to portlet view 210, and request information related to a particular item in the latest news in a portlet corresponding to portlet view 215. Furthermore, the user, through a portlet, can request different formats with which to display portlet views 205, 210, and 215. In any event, the request for updated information can create a need to change some of the information displayed within at least one of the portlet views 205, 210, and 215.

Information such as markup and data relating to a portlet can be aggregated for subsequent display by a client application, such as a web browser under the control of additional application code. In particular, in a logically separated client side/server side computing environment, information that is retained on the client side for display by the web browser can be aggregated with information that is requested by the web browser from a portal application server located on the server side of the environment. Accordingly, the aggregation of the information to be displayed can be provided on the client side rather than on the server side, thereby reducing the load on the portal application server and reducing the required bandwidth allocated to the web browser. In some embodiments, the web browser can be used to access a portal which supports multiple portlets, each of which can be customized by a user to display desired information. During this aggregation of information, the web browser only requests the information that is needed for an updated display of the portal associated with the requested information and can avoid requesting information that is not needed for the updated display. By avoiding requesting information that is not needed, the load on the portal application server is further reduced. Methods and apparatus for aggregating information for display by a client application are detailed further in U.S. application Ser. No. 10/464,910 entitled "METHODS, SYSTEMS, AND COMPUTER PROGRAM PRODUCTS FOR PORTLET AGGREGATION BY CLIENT APPLICATIONS ON A CLIENT SIDE OF A CLIENT/SERVER ENVIRONMENT" filed on Jun. 19, 2003 which is incorporated by reference herein in its entirety.

Embodiments according to the present invention provide techniques for allowing the prefetching and subsequent caching of portlet information at a client application, such as a web browser. In particular, the present invention provides a portal link structure which defines a hierarchical relationship between portlet views. The portal link structure contains references to each portlet view within a defined scope. A reference may be a URL, a URL to another portlet, a dynamic link, or other suitable reference which indicates how to access subsequently accessible portlet information from within a portlet. The portal link structure may be initially created by the portal application server and subsequently managed by a client. In some embodiments according to the present invention, the portal link structure may be initially created and managed at the client. The client updates the portal link structure by determining which portlet references have been retrieved and which portlet reference is currently being rendered as a portal view.

Figure 3A:
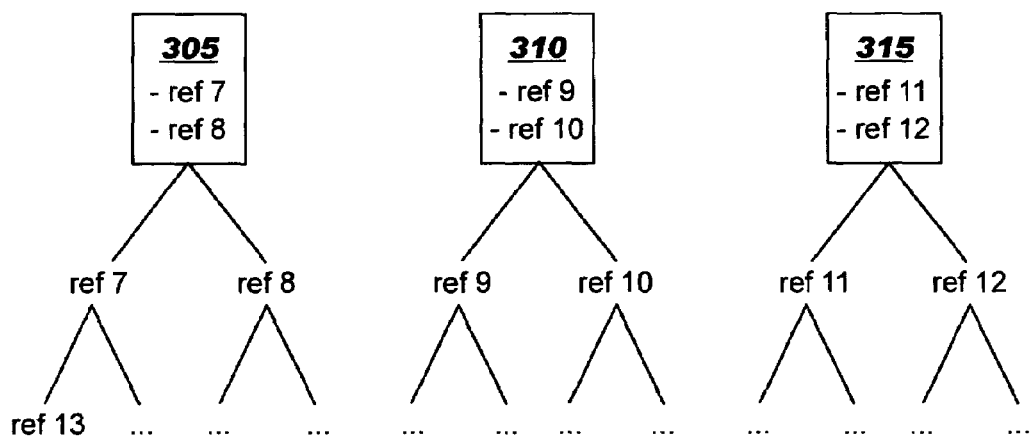
FIG. 3A is a hierarchical diagram illustrating imbedded references within portlets.

FIG. 3A is a hierarchical diagram 300 illustrating imbedded references within portlet views 305, 310, and 315. Portlet views 305, 310, and 315 may, for example, correspond to the portlet information rendered in portlet views 205, 210, and 215, respectively, in FIG. 2. In general, a reference also referred to as a link, upon execution, accesses a particular portlet view. Reference 7 and reference 8 are contained within portlet view 205. For example reference 7 may correspond to a server address where more information concerning Ameriquest Mortage Company can be found on a server connected in the network cloud 130. User access to such information would typically be displayed by a user clicking on a highlighted link, such as the highlighted link 220. Reference 8 may correspond to a dynamic link which utilizes a parameter to be sent with a request to subsequently retrieve information such as stock quote 225. Portlet view 310 contains references 9 and 10. Portlet view 315 contains references 11 and 12. References within a portlet view may be displayable to a user as discussed for references 7 and 8, or may not be displayable to a user. A tree of references is defined by iteratively determining each reference which is referred to within the information of a portlet and then determining subsequent references from the portlet information contained within each reference.

As discussed in greater detail below the present invention provides techniques for composing the tree of references. The size and number of levels of the tree of references are configurable by application code such as application code written in javascript and stored on a server, but executed on a client. The application code and its use of a framework for composing the tree of references will be described in more detail in connection with the discussion of FIG. 4.

Figure 3B:
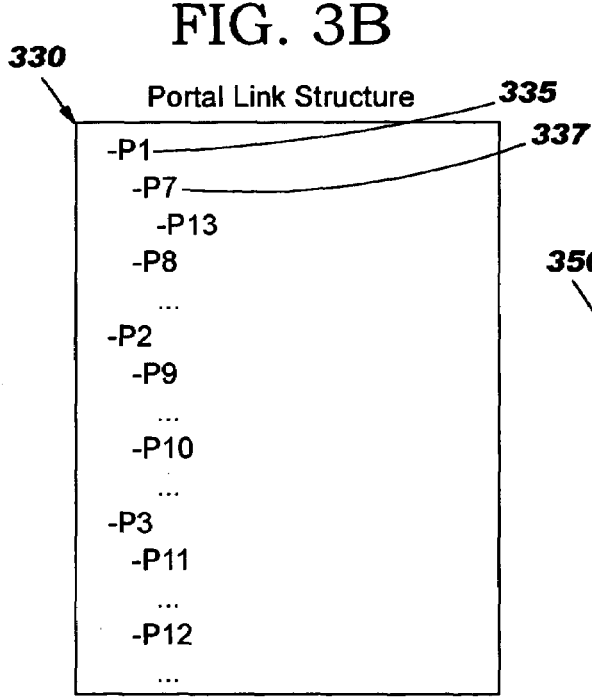
FIG. 3B is a block diagram illustrating an exemplary portal link structure in accordance with the present invention.

FIG. 3B is a block diagram illustrating an exemplary portal link structure 330 in accordance with the present invention. The portal link structure 330 is a hierarchical arrangement of portlet link entries such as portlet link entry P1 335 based on the tree of references shown in FIG. 3A. The application code determines the number of portlet link entries and the extent to which the portal link structure is completed. Typically, there is a one-to-one relationship between a portlet link entry and each portlet view generated by a portlet.

Portlet link entry P1 335 corresponds to portlet view 305. Since portlet view 305 refers to reference 7 as shown in FIG. 3A, portlet link entry P1 305 would be linked to portlet link entry P7 337 which corresponds to the portlet view referenced by reference 7. Thus, the referencing relationship between portlet link entries 335 and 337 is shown in FIG. 3B with portlet link entry 337 indented from portlet link entry 335.

By arranging the portlet link entries within a hierarchical arrangement as shown in FIG. 3B and tracking which portal views corresponding to a portlet link entry are being rendered in a display, the portlet information likely to be needed may be determined by the distances between the currently rendered portlet entries and the nonrendered portlet entries. For example, the distance between P1 and P7 is one and the distance between P1 and portlet link entry P13, a child of P7, would be two. If P1 was currently being displayed, P7 having only a distance of 1 would be more likely to be prefetched than P13 because a user would typically click on reference 7 before gaining access to reference 13. This hierarchical arrangement advantageously provides a technique for predicting which portlet information would likely be requested by a user.

Figure 3C:
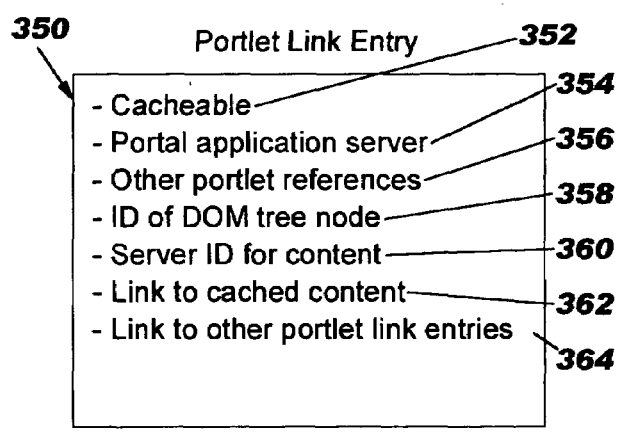
FIG. 3C is a block diagram illustrating an exemplary portlet link entry within the portal link structure of FIG. 3B in accordance with the present invention.

FIG. 3C is a block diagram illustrating an exemplary portlet link entry 350 within the portal link structure 330. For the sake of clarity, portlet link entry 350 will be described as the portlet link entry corresponding to portlet view 305 which is rendered within portal view 200. The portlet link entry 350 contains fields 352, 354, 356, 358, 360, 362, and 364 having varying types. For the sake of simplicity, the field types are not shown. It should be recognized by one skilled in the art that each field may be implemented with various field types. The cacheable field 352, the portal application server field 354, and the other portlet references field 356 generally contain information concerning the content of the current portlet link entry. For example, the cacheable field 352 contains an indication of whether the content associated with the portal link entry is cacheable or not. Some factors used in making this determination include whether the corresponding portlet view displays a dynamic result. A dynamic result may occur when the portlet view prompts a user to interact with data to perform a transaction. The portlet view referenced by the link which displays a dynamic result would typically not be cacheable. For example, if a portlet view generated by a portlet is a shopping application, the present invention would not cache the portlet view which shows the products purchased through the portlet view to preclude confusing a user who changes his or her mind during the transaction.

The portal application server field 354 contains an indication of the portal application server which serves the portlet generating the portlet view corresponding to the portal link entry. The other portlet refererences field 356 contains a list of portlet references served by the same portal application server and is accessible through the portlet view corresponding to this portlet link entry. The identification (ID) of the document object model (DOM) tree node field 358 indicates the location within the DOM which would be replaced by displaying the portlet view corresponding to this portlet link entry. The DOM is a known platform and language neutral interface specified by the W3C document object model standard that permits a script to access and update the content, structure, and style of a document.

Using a DOM-supporting programming language, such as Javascript®, information within the portlet view can be manipulated. For example, a DOM reference can be used to directly insert the requested information into an HTML page to be displayed by the client. Another aspect of a DOM-supporting programming language is the ability to access any component of a document, to update the content information included in the document, and the ability to manipulate the information separately. For example, a Javascript® script can be used to move an object from one part of a document to another. For more information on the W3C document object model standard, please refer to W3C Architecture Domain, available at http://www.w3.org/DOM/.

The server identification (ID) for content field 360 contains a unique ID of the content within the scope of the server. This ID provides the ability to retrieve the associated content from the portal application server. The link to cached content field 362 contains the local link or unique identification in a cache to retrieve the specific content from the local cache rather than the portal application server. Typically, this field is unassigned until the content has been prefetched and stored in a local cache in a client. The link to other portlet link entries field 364 contains a list of links to other portlet link entries accessible by the current link entry. In other words, this link field 364 parallels the navigational relationship between portlet views which reference other portlet views as described in FIG. 3A.

Figure 4:
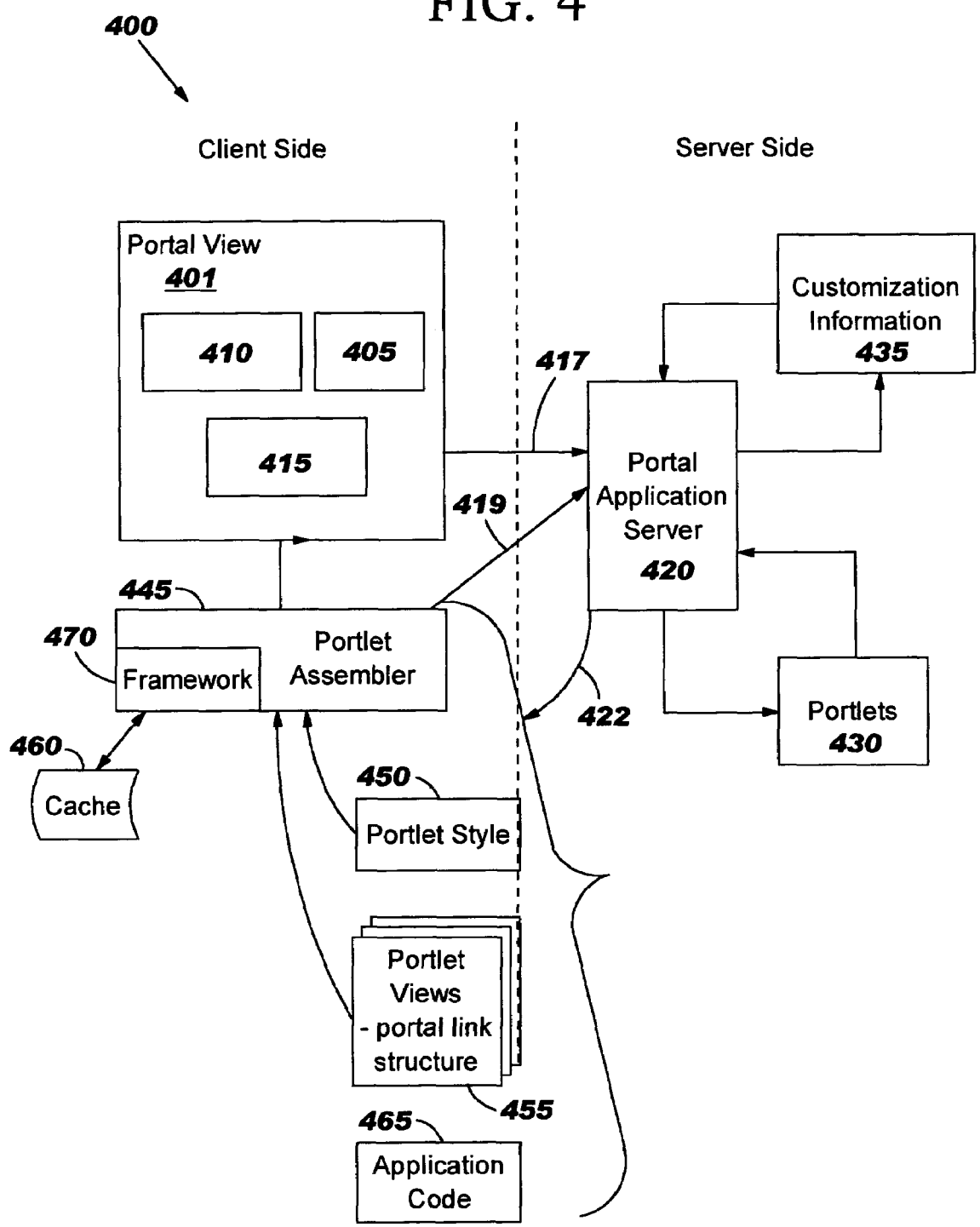
FIG. 4 is a block diagram illustrating the client/server interaction concerning the portal link structure in accordance with the present invention.

FIG. 4 is a block diagram illustrating the client/server interaction 400 utilizing the portal link structure in accordance with the present invention. According to FIG. 4, a portal 400 on a client side operates with a portal application server 220 on a server side in a logically separated client side/server side computing environment. The portal view 401 can be displayed by a client, such as a web browser, and includes portlet views 405, 410, and 415 that can be displayed within the portal view 401. When a user initially accesses a portal which results in displaying portal view 401, a request is sent to a portal application server 420 to retrieve portlet views 405, 410, and 415 for the client to render. The portlet application server 420 responds to the request for information 417 by accessing customization information 435 that can be associated with the user of the portal view 401. The customization information 435 can also include information for customizing the particular portlet views 405, 410, and 415. For example, customization information 435 for a particular portlet view can include a type of skin or screen information associated with how the portlet is to appear in the portal view corresponding to portal view 401. Furthermore, the customization information 435 can include information associated with the type of information typically desired by the user, such as a particular location associated with weather information that is displayed in one of the portlet views, a particular stock fund shown in one of the portlet views, or a particular sports teams of interest to the user.

The portal application server 420 also accesses a computer program or portlet code 430 for each portlet view which will be delivered to the portal view 401 on the client side. However, it is noted that one portlet may generate multiple portlet views such that a one-to-many relationship may exist between a portlet and generated portlet views. The portlet code 430 generates portlet information such as content consumable by a user. The portlet information may optionally include presentation information which describes how the consumable content will be displayed. For example, markup data such as data specified in extended markup language (XML) contains meta data which describes the consumable content.

The portal application server 420 analyzes each of the portlet views which would be delivered to the client for the initial view by the user. In this embodiment and during this analysis, the portal application server 420 creates a portal link structure containing portlet link entries as described in connection with FIGS. 3A and 3B. The portal link structure may also include meta data describing the portal information referenced in the portal link structure. In a preferred embodiment of the present invention, a framework 470 is provided to allow control of the analysis in building and managing the portal link structure. For example, the framework 470 provides application program utility functions to control breadth of analysis and the extent to which a portal link structure is composed. The framework 470, when executed, would advantageously coordinate the caching and prefetching of portlet information.

The portal application server 420 downloads a portlet assembler 445, the portlet style 450, and the initial portlet views 405, 410, and 415, in a response 422 as shown. The portlet style 450 contains schemes or a collection of style sheets or skins for the portlet views downloaded to the client side. Along with the portlet views, the portal link structure may also be optionally downloaded in the form of meta data to the client side. In some embodiments of the present invention, the analysis and the initial creation of the portal link structure are performed on the client side after the initial portlet views are downloaded. In any case, portal link structure is stored in memory on the client side. Memory includes random access memory (RAM), disk, tape or any other suitable storage medium.

The framework 470 also provides utilities for application code 465 to also be downloaded. Such application code utilizes functions within the framework and may include algorithms for determining the extent to which to build a portal link structure. The application code may include algorithms to determine which portlet views and how much of the portlet information is fetched before the user of the portal requests the information and whether the fetched information contains consumable content, meta data, or both. The term "prefetch" describes the process of fetching portlet information before a user requests such portlet information. In a preferred embodiment, the application code 465 is written using the Javascript® language, for example, and fits within the portal architecture. Developing the application code 465 in Javascript® advantageously allows code stored on the server to be executed on the client without any additional software other than a web browser having a Javascript® plug-in configured on the client. It should be recognized by one skilled in the art that other programming languages may be used to develop the application code 465 as long as the application code has access to functions of the framework.

The portlet assembler 445 is invoked on the client side and renders the portlet view 455 containing portlet information in the portal view 401 as portlet view 405 on the client. The application code 465 also is invoked on the client side to determine what portal information indicated by portlet link entries of the portal link structure will be prefetched. Once this determination is performed, the portlet assembler 445 in response to requests by the application code 465 initiates a prefetch request 419 to the portal application server 420. The prefetch request 419 may suitably include, for example, the reference of a portlet view contained in the portal link structure which the client wants to prefetch. In some embodiments of the present invention, the prefetch request 419 contains multiple portlet references in the portal link structure. In some embodiments of the present invention, the prefetch request 419 contains parameters describing whether to fetch only consumable data corresponding to the portlet view, meta data corresponding to the portlet view, or a combination of both consumable data and meta data corresponding to the portlet view. Since a portlet view is a portion of the viewable browser screen, all of this fetchable data is less than an entire HTML page which consumes the entire viewable browser screen.

In response to the prefetch request 419, the portal application server 420 accesses the corresponding portlets on the server side and depending on the prefetch request retrieves the requested information from the portlets. Then, the portal application server 420 downloads the requested information to the portlet assembler 445. The portlet assembler 445 stores the downloaded information into memory in the form of a cache 460. A cache may include any suitable computer readable medium including hard disks, cache memory, CD-ROMs, optical storage devices, or magnetic storage devices. When the portal user clicks on a link within a portlet view, for example, to request addition information referenced within a portlet, the portlet assembler 445 refers to the portlet link entry associated with the additional information referenced and checks whether the link to cached content field 362 contains valid data. If so, the portlet assembler advantageously retrieves the requested information from the cache 460 and renders the additional information to the user in a portlet view without having to indicate to the server that the user has navigated the website to those cached locations. Otherwise, the portlet assembler requests the additional information from the portal application server 420 utilizing the the server ID for content field 360.

Depending on the application code 465, the portlet assembler 445 would typically analyze the contents of the newly rendered portlet information to determine if there exists any references which require prefetching. If so, a prefetch request 419 is made in the manner described above and the portal link structure is updated to reflect the relationship between rendered and unrendered portlet views.

It should be recognized by one skilled in the art that a skeletal page having minimal, if any, content could be initially downloaded before portlet views 405, 410, and 415. In this aspect of the present invention, the framework 470 would download the needed portlet information in background HTTP sessions, for example. The framework 470 would then assemble the portal link structure based on the application code 465 downloaded with the skeletal page. The application code 465 would use the framework 470 to access the portal link structure meta data and use the meta data to prefetch and populate a cache of portlet views.

When rendering portlet information to a user, the portlet assembler code 445 aggregates information stored on the client side with information requested from the server side as discussed in further detail in U.S. application Ser. No. 10/464,910 entitled "METHODS, SYSTEMS, AND COMPUTER PROGRAM PRODUCTS FOR PORTLET AGGREGATION BY CLIENT APPLICATIONS ON A CLIENT SIDE OF A CLIENT/SERVER ENVIRONMENT" filed on Jun. 19, 2003.

FIG. 5 is a flowchart illustrating a process 500 according to the present invention. As shown in FIG. 5, operations can begin at step 510 by providing application code at the server side of a logically separated client side/server side computing environment. This application code is typically written in JavaScript and is executed on the client side of the computing environment. The application code contains a prefetch algorithm which controls the size and number of levels of a portal link structure and the size and quality of data to prefetch from the server side. The application code may specify a cache replacement policy such as to not replace portlet link entries which are adjacent to a portlet link entry in the portal link structure, if the portlet link entry is currently rendered as portlet view. The application code utilizes framework code. The framework code provides utility functions to control breadth of analysis, the extent to which a portal link structure is composed, and to prefetch and cache portlet information.

At step 520, the process 500 analyzes references within portlet views to complete the portal link structure. This analysis can be performed at either the server side, at the client side, or on both sides of the computing environment. At step 525, the application code and portal link structure are downloaded to the client side. At step 530, the client side invokes the application code to fetch portlet information relative to references in the portlet link entries of the portal link structure before a user requests such information. At step 540, the process 500 updates the portal link structure to reflect references within the fetched portal information. If the server side performs the analysis of step 520, the portal link structure would contain valid data on the first iteration of this method.

In an alternative embodiment where the client performs step 520, the client would receive an empty portal link structure and would populate the portal link entries therein as in step 540 before step 530.

At step 550, the process 500 displays the fetched portal information upon request of a user interfacing with the client side of the computing environment. After step 550, the process 500 proceeds to step 530 for subsequent iterations of steps 530, 540, and 550. The process 500 ends when the user no longer wants to interface with this portal.

Accordingly, in embodiments according to the present invention, a web application's response time as viewed by a user is improved by prefetching and caching portlet information at the client side rather than on the server side of the logically separated client side/server side computing environment.

Many alterations and modifications of the present invention may be made by those having ordinary skill in the art, given the benefit of present disclosure, without departing from the spirit and scope of the present invention. Therefore, it must be understood that the illustrated embodiments have been set forth only for the purposes of example, and that it should not be taken as limiting the present invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the inventive teachings of the present invention.

We claim:

1. A method for performing caching operations in a client application in a logically separated client/server computing environment, the method comprising:
   determining for a plurality of portlets in a portal which portlet information is to be prefetched for each of the portlets, the determining comprising:
      composing a portal link structure, the portal link structure comprising a hierarchical arrangement of a plurality of portlet link entries, each portlet link entry containing data describing a corresponding portlet view;

tracking a current portlet link entry as an entry whose corresponding portlet view is currently being displayed; and determining a distance between the current portlet link entry and another portlet link entry in the plurality of portlet link entries using the hierarchical arrangement of the plurality of portlet link entries to determine which corresponding portlet views should be prefetched;

prefetching based on the determining a distance, on a client of the logically separated client/server computing environment, the portlet information from a server for the plurality of portlets in the portal, the prefetching being done before the portlet information is requested;

storing the prefetched portlet information on a client computer; and displaying the prefetched portlet information upon request of a user.

2. The method of claim 1 wherein the prefetching step further comprises:

requesting portlet information from a portal application server on the server.

3. The method of claim 1 wherein the displaying step further comprises:

displaying the prefetched portlet information through a web browser.

4. The method of claim 1 wherein the storing step further comprises:

storing the prefetched portlet information to a cache.

5. The method of claim 1 further comprising:

downloading framework code to the client computer, the framework code providing utility functions for performing, when executed on the client computer, the prefetching and storing steps.

6. The method of claim 1 wherein the prefetched portlet information is less than an entire amount of information in an HTML page.

7. The method of claim 1 wherein the displaying step further comprises:

combining prefetched portlet information with portlet information retrieved upon the user's request.

8. A computer program product for performing caching operations in a client application in a logically separated client/server computing environment, comprising:

a computer readable storage medium having computer readable program code embodied therein, the computer readable program product further comprising:

a computer readable program code configured to determine for a plurality of portlets in a portal which portlet information is to be prefetched for each of the portlets, the computer readable program code configured to:

compose a portal link structure, the portal link structure comprising a hierarchical arrangement of a plurality of portlet link entries, each portlet link entry containing data describing a corresponding port let view;

track a current portlet link entry as an entry whose corresponding portlet view is currently being displayed;

determine a distance between the current portlet link entry and another portlet link entry in the plurality of portlet link entries to determine which corresponding portlet views should be prefetched;

prefetch, on a client of the logically separated client/server computing environment, the portlet information from the server for the plurality of portlets in a portal, the prefetching being done before the portlet information is requested;

store the prefetched portlet information on a client computer; and display the prefetched portlet information upon request of the user.

9. The computer program product of claim 8 wherein the computer readable program code configured to prefetch portlet information further comprises:

request portlet information from a portal application server on the server.

10. The computer program product of claim 8 wherein the computer readable program code configured to display the prefetched portlet information further comprises:

displaying the prefetched portlet information through a web browser.

11. The computer program product of claim 8 wherein the computer readable program code configured to store the prefetched portlet information further comprises:

store the prefetched portlet information to a cache.

12. The computer program product of claim 8 wherein the computer readable program code configured to prefetch portlet information and the computer readable program code configured to storing prefetched portlet information are combined into framework code, the computer program product further comprising:

download framework code to the client computer.

13. The computer program product of claim 8 wherein portlet information is less than an HTML page.

14. The computer program product of claim 8 wherein the computer readable program code configured to display prefetched portlet information further comprises:

combine prefetched portlet information with portlet information retrieved upon the users request.

* * * * *

UNITED STATES PATENT AND TRADEMARK OFFICE
CERTIFICATE OF CORRECTION

PATENT NO.       : 7,624,160 B2                                             Page 1 of 1
APPLICATION NO.  : 10/838837
DATED            : November 24, 2009
INVENTOR(S)      : Henderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this

Twenty-sixth Day of October, 2010

David J. Kappos
*Director of the United States Patent and Trademark Office*